United States Patent [19]
Kubota

[11] Patent Number: 6,164,955
[45] Date of Patent: Dec. 26, 2000

[54] DISK SUBSTRATE INJECTION MOLD

[75] Inventor: Suinobu Kubota, Sakaki-machi, Japan

[73] Assignee: Nissei Plastic Industrial Co., Ltd., Nagano-ken, Japan

[21] Appl. No.: 09/219,017

[22] Filed: Dec. 23, 1998

[30] Foreign Application Priority Data

Dec. 25, 1997 [JP] Japan .................................... 9-358352
Jan. 19, 1998 [JP] Japan ................................. 10-008115
Dec. 17, 1998 [JP] Japan ................................. 10-359748

[51] Int. Cl.⁷ .................................................. B29C 45/43
[52] U.S. Cl. ........................... 425/556; 425/810; 425/437
[58] Field of Search .................................... 425/437, 556, 425/810; 264/106, 1.33

[56] References Cited

U.S. PATENT DOCUMENTS

| | | | |
|---|---|---|---|
| 4,531,703 | 7/1985 | Underwood | 249/66 A |
| 4,961,884 | 10/1990 | Watanabe et al. | 264/106 |
| 5,326,240 | 7/1994 | Kudo et al. | 425/3 |
| 5,720,994 | 2/1998 | Asai | 425/556 |
| 5,804,229 | 9/1998 | Asai | 425/556 |

FOREIGN PATENT DOCUMENTS 778318 12/1965 Canada .
6-71656 3/1994 Japan .

*Primary Examiner*—Robert Davis
*Assistant Examiner*—Donald Heckenberg
*Attorney, Agent, or Firm*—Merchant & Gould P.C.

[57] ABSTRACT

A disk substrate injection molding mold comprises a stationary mold half, a movable mold half capable of mated engagement with the stationary mold half and having, on a side thereof confronting the stationary mold half, a cavity for being filled with a molten material for molding a disk substrate, at least one air nozzle for blowing out into the cavity air fed through the movable mold half for peeling the molded disk substrate off the cavity, and a valve mechanism disposed between the stationary mold half and the movable mold half for selection-controlling on/off of the feed of air to the air nozzle. Since the valve mechanism is built in the mold, the volume of the flow passage from the valve mechanism to the air nozzle becomes small. As a result, the molded disk substrate is peeled off from the cavity immediately an air blow signal is sent out, thus improving the response capability of the mold. Further, because the volume of the flow passage is small, uneven peeling can be avoided, thereby improving the quality of the molded article.

4 Claims, 4 Drawing Sheets

DISK SUBSTRATE INJECTION MOLD

BACKGROUND OF THE INVENTION

1. Field of the Invention

The present invention relates to a mold for injection molding a precision molded article such as an optical disk, which has an air nozzle for peeling the molded article off the mold.

2. Description of the Related Art

In general molding, a protrusion pin is used to take out a molded article from a mold. In contrast, a precision molded article such as an optical disk is peeled off a mold by air, because the quality of the resulting molded article is influenced by the good and bad of the peel-off of the molded article from the mold.

A technique for peeling a molded article off a mold by air is known from, for example, Japanese Patent Laid-Open Publication No. HEI-6-71656 entitled "MOLDING APPARATUS AND METHOD". The conventional molding apparatus comprises a molding section, a mold disposed remotely from the molding section and composed of a stationary mold half and a movable mold half, and air piping branched within the molding section into two pipes which are respectively connected via air blow ports to the stationary mold half and the movable mold half and opening into the mold halves. An air open/close valve and a pressure regulator are connected to the branched pipes inside the molding section so that the stationary and movable mold halves can be air-controlled independently. The pressure regulator comprises a check valve, a surge tank spaced from the check valve, and a pressure adjusting section branched off from the surge tank.

In the conventional apparatus thus arranged, since the molding section is large-sized due to various valves provided therein, it has to be disposed remotely from the mold. In addition, it becomes necessary for the air blow ports to be formed of a relatively long pipe.

Using the conventional molding apparatus arranged as explained above, the present inventor has made an attempt to injection mold an optical disk substrate. However, it was found that since the intended peeling starts with a delay from the feed of an air blow signal, there often occurs incomplete or uneven peeling which leads to undesired deformation of the resulting molded article.

In a continued research to overcome the foregoing problem, the present inventor has found that because the molding section is positioned distantly from the mold, the volume of a flow passage within the piping connecting the mold section and the mold become large, thereby causing the flow passage space to take time to be filled with air of a predetermined pressure. It is also assumed that since it is a gaseous body capable of being compressed, air flows turbulently through such a volumetrically-large flow passage.

With a prospect that the foregoing problem can be solved by minimizing the volume of the flow passage, an experiment was carried out which ended up proving the prospect. This has lead to the present invention.

SUMMARY OF THE INVENTION

According to an aspect of the present invention, there is provided a disk substrate injection molding mold which comprises a stationary mold half, a movable mold half capable of mated engagement with the stationary mold half and having, on a side thereof confronting the stationary mold half, a cavity for being filled with a molten material for molding a disk substrate, at least one air nozzle for blowing out into the cavity air fed through the movable mold half for peeling the molded disk substrate off the cavity, and a valve mechanism disposed between the stationary mold half and the movable mold half for selection-controlling on/off of the feed of air to the air nozzle.

Since the valve mechanism is built in the mold, the volume of the flow passage from the valve mechanism to the air nozzle becomes small. As a result, the molded disk substrate is peeled from the cavity immediately when an air blow signal is sent out, thus improving the response capability of the mold. Further, because the volume of the flow passage is small, uneven peeling can be avoided, thereby improving the quality of the molded article.

It is desirable that in addition to the air flow on/off switching function, the valve mechanism has an air flow rate adjusting function. This enables air flow rate adjustment within the mold, thereby making the associated installations compact.

The valve mechanism may be disposed in the mold such that it does not project from an outer surface of the mold.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENT

The following description is merely exemplary in nature and is in no way intended to limit the invention or its application or uses.

Figure 1:
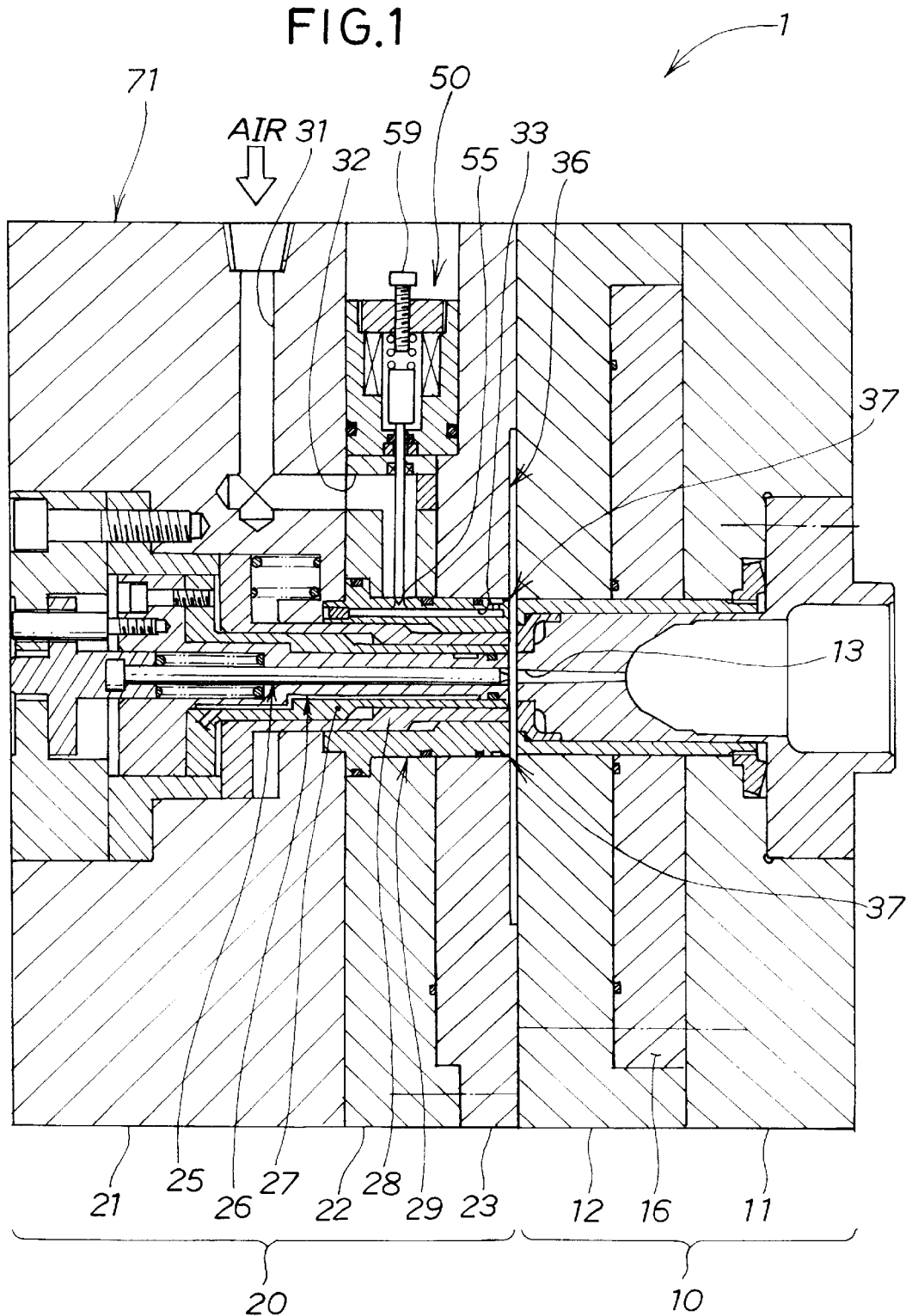
FIG. 1 is a cross-sectional view illustrating a disk substrate injection molding mold according to the present invention.

Referring to FIG. 1, a disk substrate injection molding mold 1 according to the present invention comprises a stationary mold half 10 and a movable mold half 20.

The stationary mold half 10 comprises a mount plate 11, a mirror plate 12 coupled with the mount plate 11, and a gate 13 disposed centrally of the mount plate 11 and the mirror plate 12. Reference numeral 16 designates a back plate.

Similarly, the movable mold half 20 comprises a mount plate 21 and a mirror plate 23 coupled therewith via a back plate 22. Provided centrally of the mount plate 21 and the mirror plate 23 are a protrusion pin 25, a gate-cut core 26, a sleeve 27, a protrusion sleeve 28, and a guide sleeve 29, all being disposed concentrically. The mount plate 21 and the back plate 22 have at upper parts thereof an air passage 31 and a air passage 32 extending therethrough. The air passage 32 communicates with an air passage 33 formed in the guide sleeve 29. Within the air passage 32, there is provided a valve mechanism 50 which will be discussed later in relation to FIGS. 2A and 2B.

Reference numeral 36 designates a cavity to be filled with a molten material. Reference numerals 37, 37 denote air nozzles which take the form of a slit defined between an outer peripheral surface of the guide sleeve 29 and the mirror plate 23 and comprise ring nozzles having a diameter equal to an outer diameter of the guide sleeve 29.

Figure 2A:
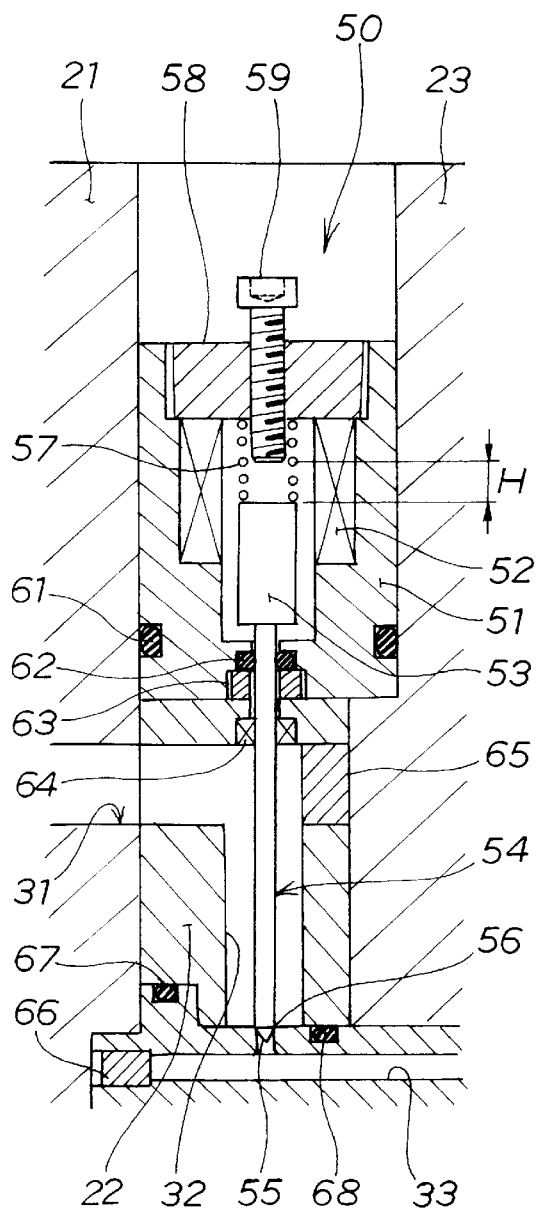
FIGS. 2A and 2B are enlarged cross-sectional views illustrating a valve mechanism of the mold of FIG. 1.

Turning now to FIG. 2A, the valve mechanism 50 is shown as being placed in a valve closed position. The valve mechanism 50 comprises a solenoid driven needle valve which includes a case 51, a solenoid 52 mounted to the case 51, a core 53 disposed internally of the solenoid 52 and capable of vertical movement, and a needle 54 extending from the core 53 and having at a distal end (lower end) a valve member 55 of pointed configuration, the valve member 55 being held against a valve seat 56.

The case 51 may be formed from a square steel by machining. Alternatively, it may be machined out from a square block produced by casting or forging. Then, the required notching process used in to the movable mold half 20, the back plate 22 and the mirror plate 23 becomes easy. By making the external dimension of the case 51 conform to the thickness of the back plate 22, the notching process with respect to the mirror plate 23 can be omitted.

Reference numeral 57 designates a valve spring; 58 designates a lid; 59, a valve lift adjusting screw; 61, 62, O-rings; 63, a sleeve; 64, packing; 65, 66, blind plugs; and 67, 68, O-rings.

The valve spring 57 urges the valve member 55 against the valve seat 56. The O-rings 61, 62 and packing 64 provide a seal for air flowing from the air passage 32 to the case 51. The sleeve 63 serves as a guide member for the needle 54 and prevents swinging of the needle 54. The blind plugs 65, 66 are press fit into appropriate portions of the air passages 32, 33 formed by drilling. The O-rings 67, 68 also act as seal members for preventing leakage of air.

For causing air to flow, the solenoid 52 is energized to be placed in an excited state so that the resulting magnetic force will move the core 53 to a valve-open position. The core 53 stops upon hitting the valve lift adjusting screw 59.

Figure 2B:
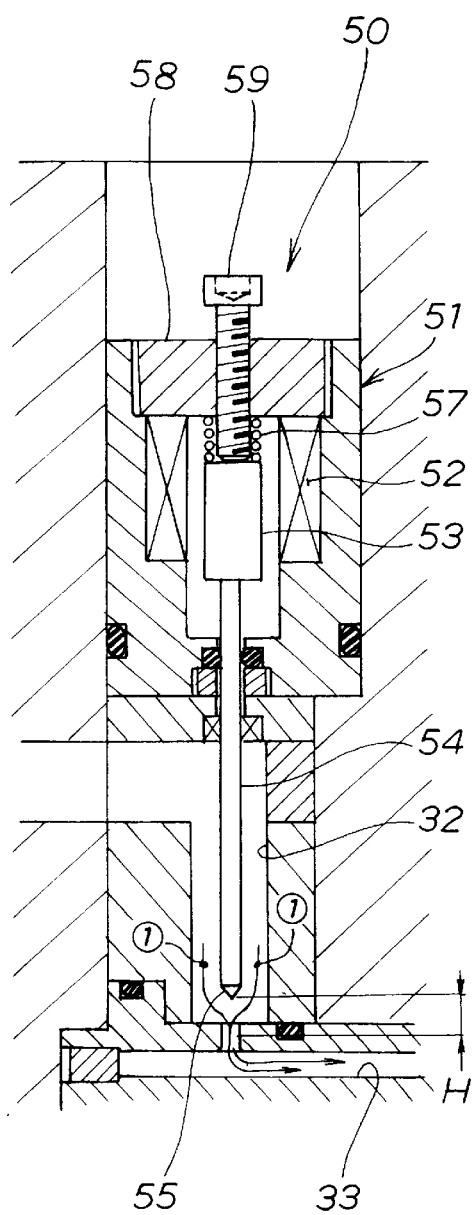

In FIG. 2B, the valve mechanism 50 is shown as being placed in a valve-open position. The air flows through the air passage 32 into the air passage 33, as shown by arrows 1, 1 in circle, and blows out from the air nozzles 37, 37 (see FIG. 1).

The valve member 55 is lifted up by a height H. When the height H becomes small, the flow rate of air also becomes small. Conversely, when the height becomes large, the flow rate of air also becomes large. The height (lift amount) H can be adjusted by turning the valve lift adjusting screw 59 in a clockwise or counter-clockwise direction.

When the energization of the solenoid 52 is interrupted to make the magnetic force die out, the valve mechanism 50 is returned to its valve-close position by the resiliency of the valve spring 57.

As explained above, the valve mechanism 50 has an air on/off control (air flow permitting/inhibiting) function, as well as an air flow rate adjusting function. Since the valve mechanism 50 is thus provided with the air flow rate adjusting function, there is no need to dispose such an air flow rate adjusting function upstream of the valve mechanism 50 as in the conventional arrangement. As a result, it becomes possible to simplify air feed installations.

Discussion will be made next as to an operation of the thus far explained injection molding mold 1.

Figure 3A:
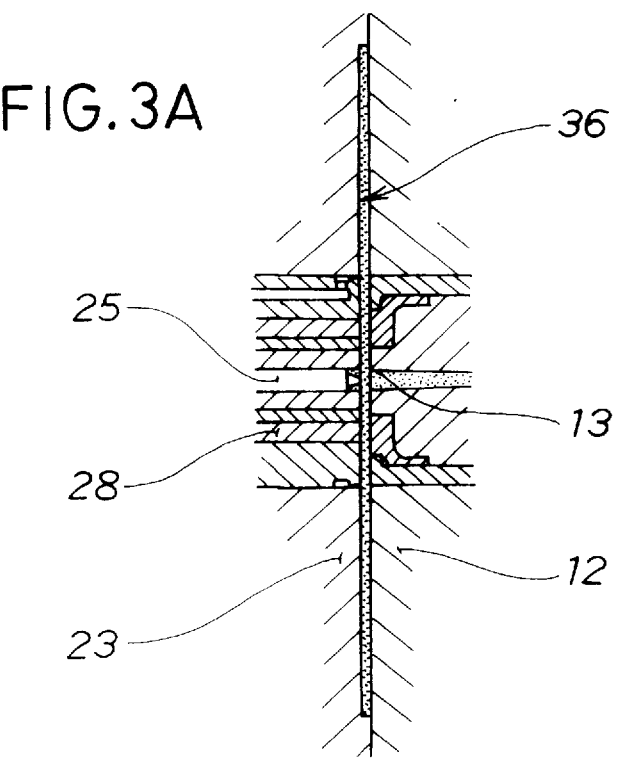
FIGS. 3A and 3B are partial schematic views showing operations of the mold.

FIG. 3A illustrates an injection process performed in the injection molding mold 1. A molten material is being filled in the cavity 36 through the gate 13.

Figure 3B:
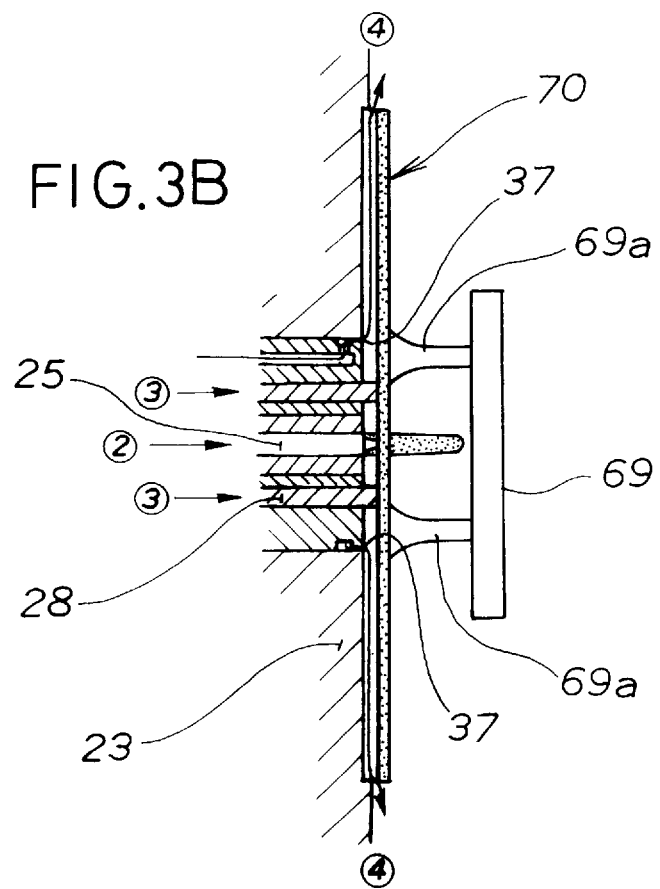

FIG. 3B illustrates a product thrusting process performed in the injection molding mold 1. The disk substrate 70 is forced out from the cavity 36 by causing the protrusion pin 25 and protrusion sleeve 28 to protrude in directions of arrows 2, 3 in circle, respectively, and then peeled off from the mirror plate 23 of the movable mold half 20 by air blowing out from the air nozzles 37, 37 and flowing in directions of arrows 4, 4 in circle. The protrusion of the protrusion pin 25 and the protrusion sleeve 28 may be effected simultaneously with the start of the air blow or in a predetermined sequential order.

In this manner, the disk substrate 70 can be quickly released from the mirror plate 23 of the movable mold half 20 without being deformed in any way. At this time, it is desirable that the disk substrate 70 is suck-retained by an eject head 69 having sucking cups 69a, 69a.

Returning to FIG. 1, since the distance between the valve member 55 and the air nozzles 37 is short and hence the volume of the flow passage between the valve member 55 and the nozzles 37 is small, the flow passage space is filled with air immediately, and the valve member 55 is shifted from a closed state to an opened state, thereby causing air of predetermined pressure to blow out instantly from the air nozzles 37. Consequently, there is no fear that a time delay and hence incomplete peeling occur which lead to damaging of the disk substrate 70.

Figure 4:
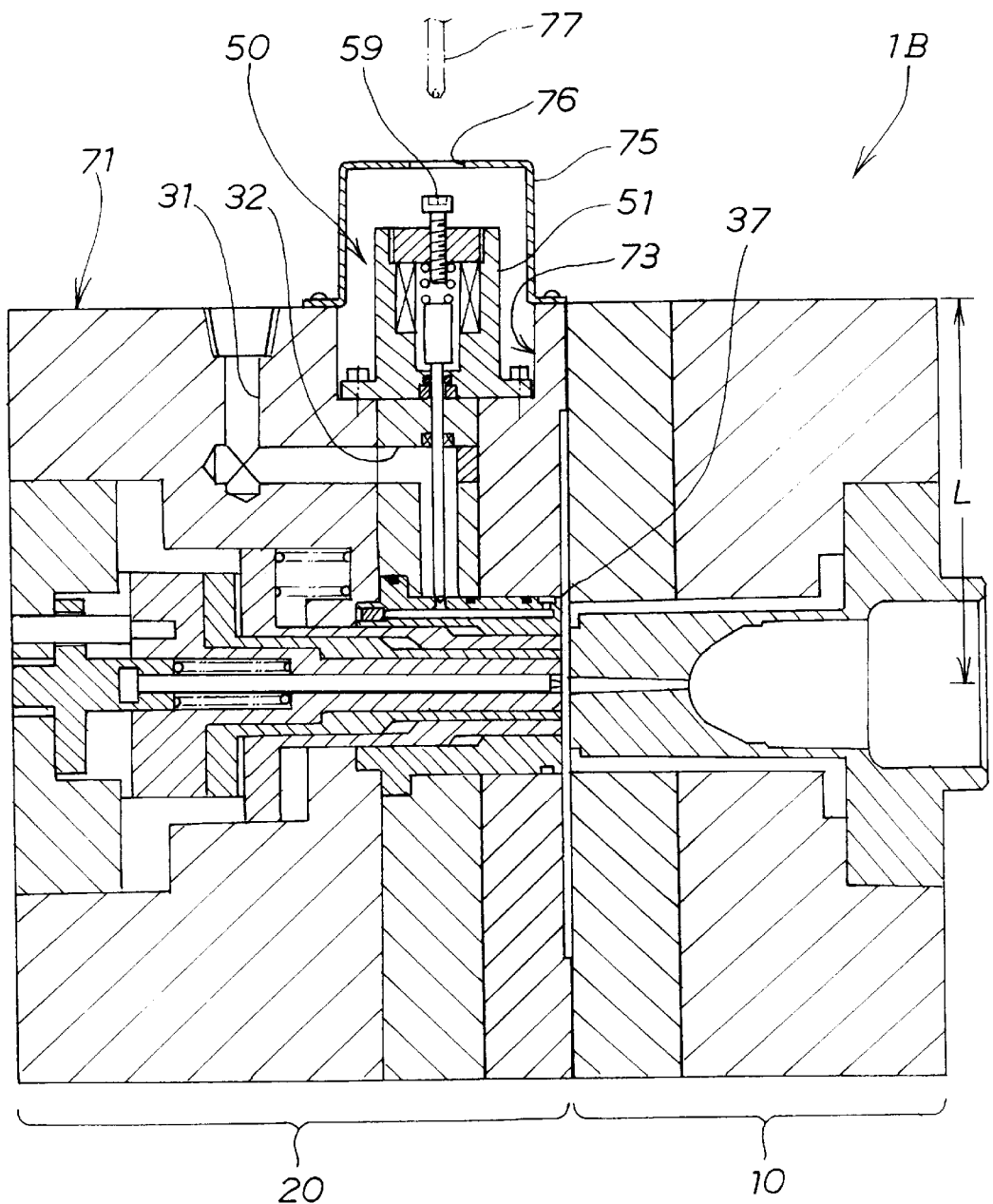
FIG. 4 is a cross-sectional view illustrating an alteration of the mold.

Turning now to FIG. 4, an alteration of the injection molding mold is shown in cross-section. Here, corresponding reference numerals will be used for the same or corresponding parts shown in FIG. 1, and their discussion will be omitted. An injection molding mold 1B is suited to a situation where a small mold is desired, or where a distance L from a mold center to an external surface 71 is desired to be small. The movable mold half 20 has a shallow recess 73 for accommodating the valve mechanism 50 with a lower half of the case 51 received therein. Upper half of the case 51 projecting from the outer surface 71 of the movable mold half 20 is covered by a cover 75.

For adjusting the valve lifting, a tool 77 such as a screw driver is engaged in an aperture 76 formed in the cover 75.

In the injection molding mold 1 shown in FIG. 1, the valve mechanism 50 is completely built in the movable mold half 20 and has nothing projecting from the outer surface 71, thereby rendering the movable mold half 20 easy to handle. However, the movable mold half 20 becomes somewhat complicated in construction and hence is liable to increase the production cost of the mold.

By contrast, the injection molding mold 1B shown in FIG. 4 has the valve mechanism 50 which allows for easy mounting, thereby keeping the mold cost to a minimum. By making the recess 73 shallower or abolishing the same, further cost-down becomes possible, although the amount of projection of the valve mechanism 50 becomes larger.

Accordingly, depending on the shape and internal constitution of the injection molding mold 1, 1B, decision may be made as to whether the valve mechanism 50 should be completely buried, half buried in the movable mold half, or completely exposed.

In the described embodiment, the valve mechanism 50 comprises a solenoid driven needle valve which is compact and hence desirable. However, in its place, an air pressure driven valve, a hydraulically driven valve and a motor driven valve may also be used. Similarly, in place of the needle valve, a single seat valve, a ball valve and a gate valve may also be used. In short, as long as it can be assembled with the injection molding mold, any valve can be used irrespective of its type and kind.

The term "disk substrate" used herein represents not only an optical disk substrate but also any other disk-shaped precision molded article. Similarly, the term "disk" used herein represents not only a thin disk but also any oval or polygonal thin plates.

Although the valve mechanism 50 has been described in relation to the above embodiment as being mounted to the movable mold half 20, it is arbitrary to mount the valve mechanism 50 to the stationary mold half 10 or to provide the mechanism in both the stationary mold half 10 and the movable mold half 20.

Obviously, various minor changes and modifications of the present invention are possible in the light of the above teaching. It is therefore to be understood that within the scope of the appended claims, the present invention may be practiced otherwise than as specifically described.

What is claimed is:

1. A disk substrate injection molding mold comprising:
   a stationary mold half;
   a movable mold half capable of mated engagement with said stationary mold half and defining, jointly with said stationary mold, a cavity for being filled with molten material for molding a disk substrate;
   at least one air nozzle for blowing out into said cavity air fed through at least one of said stationary mold half and said movable mold half for peeling the molded disk substrate off said cavity; and
   a valve mechanism mounted to said at least one of said stationary mold half and said movable mold half for selection-controlling on/off of the feed of air to said air nozzle, said valve mechanism including means for adjusting flow rate.

2. A disk substrate injection molding mold according to claim 1, wherein said valve mechanism is disposed in said mold such that it does not project from an external surface of said mold.

3. A disk substrate injection molding mold according to claim 1, wherein said at least one of said stationary mold half and said movable mold half has an air passage leading to said nozzle, and said valve mechanism includes a valve member movable across said air passage to selectively close and open said air passage, and said flow rate adjusting means includes means for adjusting the amount of movement of said valve member to vary the flow rate of air flowing through said air passage.

4. A disk substrate injection molding mold according to claim 3, wherein said valve mechanism is comprised of a solenoid driven needle valve including a solenoid mounted to said at least one of said stationary mold half and said movable mold half, a movable core disposed interiorly of said solenoid, a needle extending from said core and having a distal end forming said valve member, a valve spring urging said core to move said valve member into a valve-closing position in which said valve member blocks air from flowing through said air passage, wherein said solenoid is excitable to move said core against the force of said valve spring so as to place said valve member into a valve-open position in which said valve member allows air to flow through said air passage, and wherein said adjusting means includes a valve lift adjusting screw engageable with said core to define said valve-open position of said valve member, said valve lift adjusting screw being capable of being turned to adjust the valve-open position of said valve member.

* * * * *